United States Patent [19]

Renny

[11] 4,191,129
[45] Mar. 4, 1980

[54] ART OF EXHIBITING FISH

[76] Inventor: Arthur B. Renny, 11688 Wayburn, Detroit, Mich. 48224

[21] Appl. No.: 878,706

[22] Filed: Feb. 17, 1978

[51] Int. Cl.² ............................................ A01K 64/00
[52] U.S. Cl. ....................................................... 119/5
[58] Field of Search ...................... 119/5; D30/6, 7, 8, D30/9

[56] References Cited

U.S. PATENT DOCUMENTS

| D. 48,108 | 11/1915 | Halterbeck | 119/5 X |
| D. 92,776 | 7/1934 | Shannon | 119/5 X |
| 2,293,612 | 8/1942 | Montague | 119/5 X |
| 3,721,212 | 3/1973 | Groth | 119/5 |
| 4,078,522 | 3/1978 | Akers | 119/5 |

FOREIGN PATENT DOCUMENTS 2150023  4/1973  Fed. Rep. of Germany .............. 119/5

*Primary Examiner*—Russell R. Kinsey
*Assistant Examiner*—Robert P. Swiatek

[57] ABSTRACT

Improvement in the art of exhibiting fish comprising a vertical aquarium consisting of a transparent fish tank and a metal cowl, the aquarium requiring the usual accoutrements for proper operation thereof, the fish tank standing vertically and having a height greater than its width or depth, the cowl standing vertically and having a height, width, and depth greater than that of the fish tank, the cowl covering the accoutrements and silencing in part the noise from the operation thereof, the cowl having a cutaway portion in the front and side walls thereof so as to expose the fish tank to view, and the fish tank having radiused front corners and no seams therealong so as to present from the front and sides thereof a full and unobstructed view thereof, the cowl having vertically extending sheet metal stanchions at the rear corners of the fish tank, the cutaway portion extending continuously around the sides and front of the cowl from one rear corner stanchion thereof to the other, whereby the cowl is wholly devoid of any front corner stanchions resulting in the aforementioned full and unobstructed view of the fish tank.

6 Claims, 7 Drawing Figures

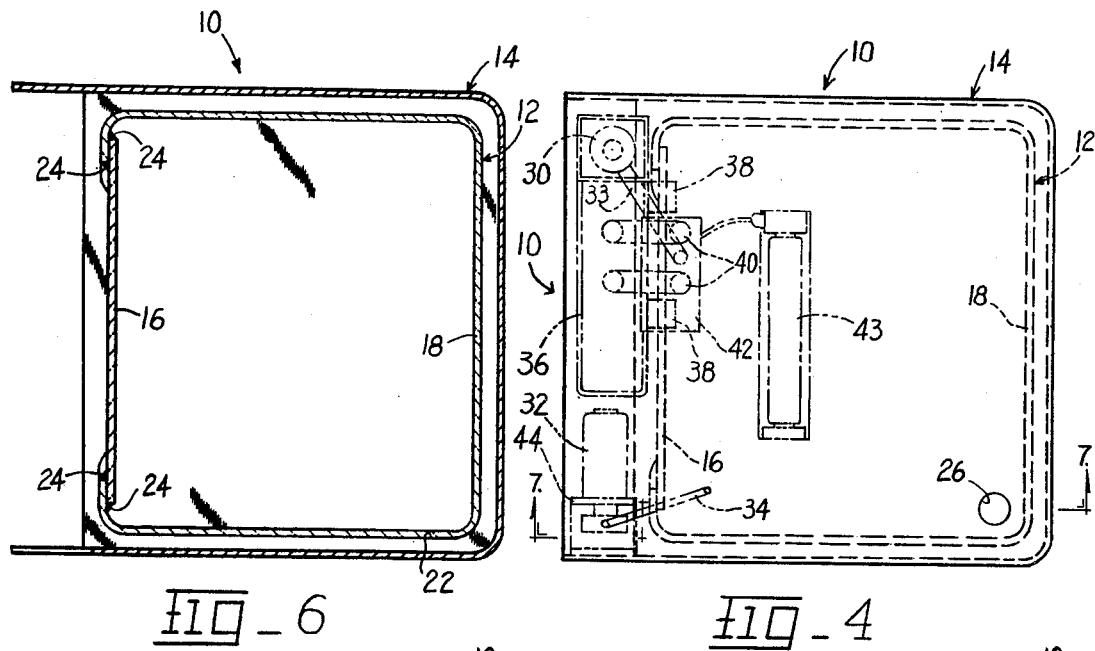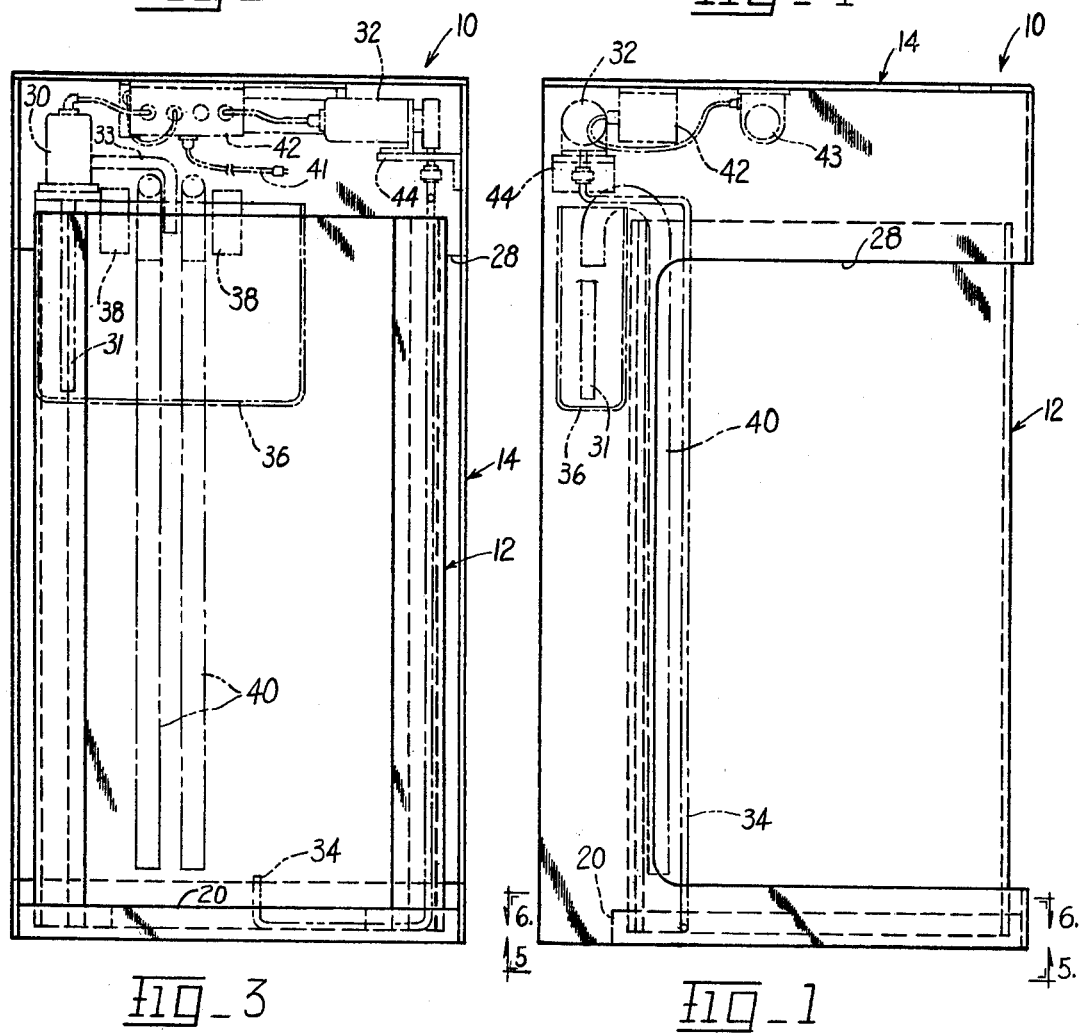

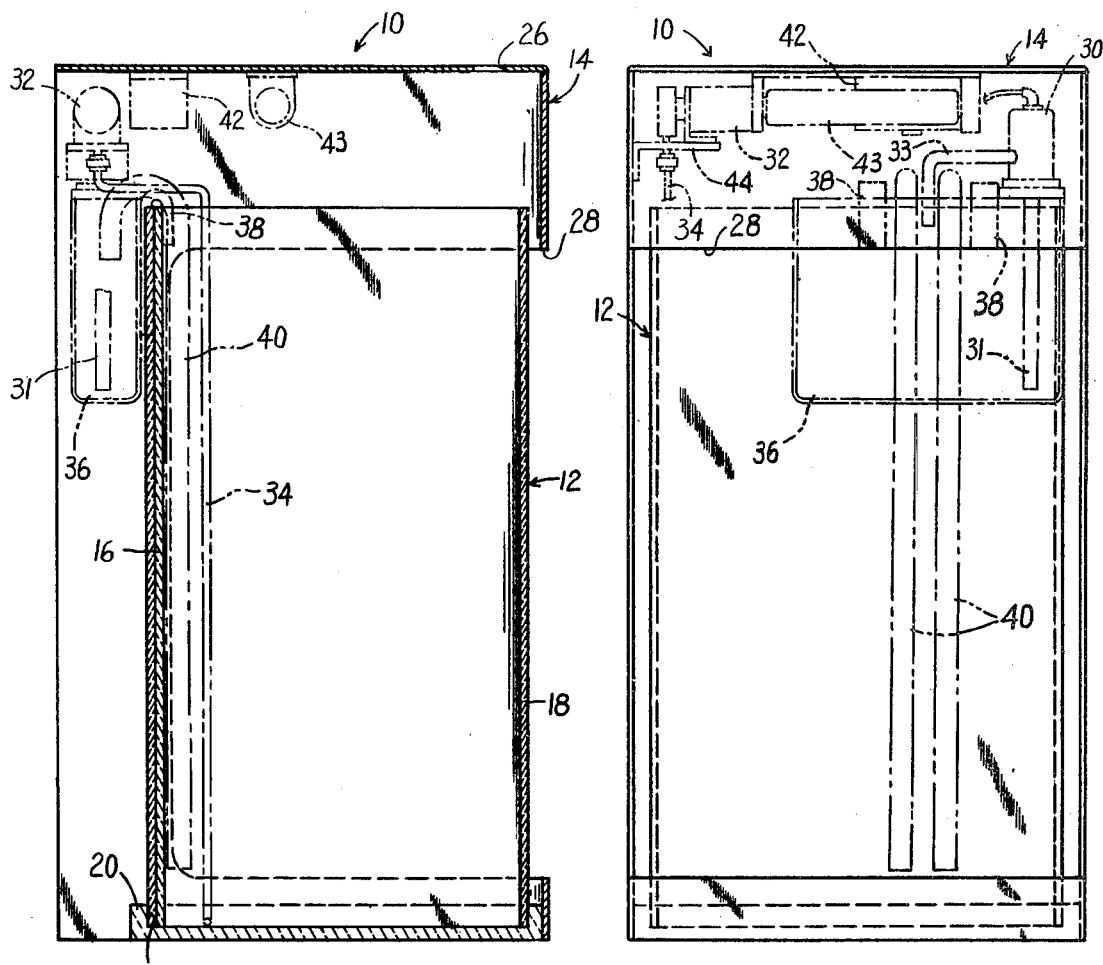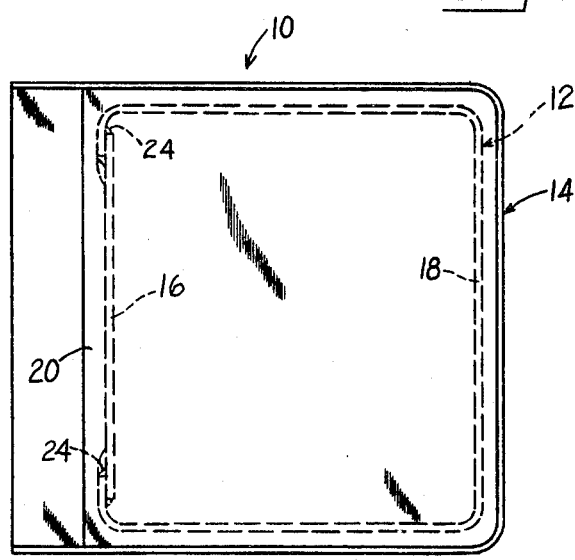

ART OF EXHIBITING FISH

My invention relates to the art of exhibiting fish.

The principal object of my invention is the provision of improvements relating to aquariums by which fish are exhibited in a more attractive setting and the accoutrements therefor covered and the noise therefrom silenced in part.

The foregoing object of my invention, together with the advantages thereof, will become apparent during the course of the following description, taken in conjunction with the accompanying drawings, in which:

FIGS. 1-5, respectively, side, front and rear elevational and top and bottom plan views of an aquarium embodying my invention;

FIG. 6 is an horizontal sectional view of the structure of FIG. 1 taken on the line 6—6 thereof; and FIG. 7 is a vertical sectional view of the structure of FIG. 4 taken on the line 7—7 thereof.

Referring to the drawings in greater detail, 10 generally designates said embodiment of aquarium which comprises a vertical fish tank 12 formed of transparent plastic (synthetic resin) and a metal cowl 14. Said tank 12 consists of two sheets and a base designated 20. One of said sheets, designated 16, is straight and forms the back wall of said tank 12 and the other, designated 18, is bent and forms the front and side walls thereof. The base 20 forms the bottom of the fish tank 12 and supports the sheets 16 and 18 so that they stand upright. The free ends of the bent sheet 18 wrap around the backside of the straight sheet 16. The base 20 is provided with an upwardly facing cavity 22 in which the bottom edges of the sheets 16 and 18 are disposed and supported against water pressure. As shown in FIG. 5 the shape of the cavity 22 corresponds to that of the sheets 16 and 18 and supports them over most of their lengths. The sheets 16 and 18 are cemented together and to the base 20, as at 24, so as to form a water-tight upright container having no seams along the front corners thereof. The cowl 14 is taller and has a greater depth and width than the fish tank 12 and sets over and around the latter and covers the accoutrements therefor and in part silences the noise therefrom. Said accoutrements consist of a water pump 30 having an inlet tube 31, and an outlet 33, an air pump 32 having an air tube outlet 34, a water filter 36 including hangers 38 therefor, siphon hoses 40, an electrical junction box 42 having an electrical line 41 for connecting to an A.C. source, and an electrical light 43. The cowl 14 has a top wall provided with an aperture 26 through which the fish are fed and front and side walls provided with a cutaway portion 28 to expose to view the front and side walls of the fish tank 12. The rear parts of said side walls remaining from the formation of said cutaway portion 28 form vertically extending sheet metal stanchions at the rear corners of the fish tank 12. The cutaway portion 28 extends, as shown, continuously around the sides and front of the cowl 14 from one rear corner stanchion thereof to the other, whereby the cowl 14 is wholly devoid of any front corner stanchions which results in a full and unobstructed view of said fish tank 12. Said cowl 14 provides a support above the fish tank 12 for the junction box 42, the light 43 and the air pump 32. The latter rests upon a shelf 44 fastened to a side wall of cowl 14. By being disposed above the fish tank 12 the air pump 32 is secure against damage from siphoning action in the event of a power failure. Said accoutrements function in a conventional matter, i.e. the air pump 32 pumps air via the air tube 34 to the bottom of the fish tank 12 where it percolates through gravel, the siphon tubes 40 move water from near the bottom of the fish tank 12 to the filter 36 and the water pump 30 pumps filtered water into the top of the fish tank 12.

It will thus be seen that there has been provided by my invention improvements in the art of exhibiting fish in which the object hereinabove set forth, together with many thoroughly practical advantages, has been successfully achieved. While a preferred embodiment of my invention has been shown and described it is to be understood that variations and changes may be resorted to without departing from the spirit of my invention as defined by the appended claims.

What I claim is:

1. Improvement in the art of exhibiting fish comprising a vertical aquarium consisting of a transparent fish tank and a metal cowl, said aquarium requiring the usual accoutrements for proper operation thereof, said fish tank standing vertically and having a height greater than its width or depth, said cowl standing vertically and having a height, width, and depth greater than that of said fish tank, said cowl covering said accoutrements and silencing in part the noise from the operation thereof, said cowl having a cutaway portion in the front and side walls thereof so as to expose said fish tank to view, and said fish tank having radiused front corners and no seams therealong so as to present from the front and sides thereof a full and unobstructed view thereof, said cowl having vertically extending sheet metal stanchions at the rear corners of said fish tank, said cutaway portion extending continuously around the sides and front of said cowl from one rear corner stanchion thereof to the other, whereby said cowl is wholly devoid of any front corner stanchions resulting in the aforesaid full and unobstructed view of said fish tank.

2. Improvement as claimed in claim 1, said fish tank formed of two sheets and a base, said base forming the bottom of said fish tank, one of said sheets being straight and forming the back wall of said fish tank, and the other being bent and forming the front and side walls thereof, said base having an upwardly facing cavity therein in which said sheets are disposed and the bottom edges thereof supported against water pressure.

3. Improvement as claimed in claim 1, said cowl having a flat top wall, said accoutrements including an air pump, the cowl having a shelf on the inside thereof beneath said top wall and above the fish tank for supporting said air pump.

4. Improvement in the art of exhibiting fish comprising a method, said method consisting of providing a vertical aquarium, said aquarium consisting of a transparent fish tank and a metal cowl, said aquarium requiring the usual accoutrements for proper operation thereof, said fish tank having a height greater than its width or depth, standing said fish tank vertically, said cowl having a height, width and depth greater than that of said fish tank, standing said cowl vertically so that it covers said accoutrements and silences in part the noise from the operation thereof, providing a cutaway portion in said cowl so as to expose said fish tank to view, and providing for said fish tank radiused corners therealong so as to present from the front and sides thereof a full and unobstructed view thereof, providing said cowl with vertically extending sheet metal stanchions at the rear corners of the fish tank, extending said cutaway portion continuously around the sides and front of said cowl from one rear corner stanchion thereof to the other, whereby said cowl is wholly devoid of any front corner stanchions resulting in the aforesaid full and unobstructed view of said fish tank.

5. Improvement as claimed in claim 4, forming said fish tank of two sheets and a base, said base forming the bottom of said fish tank, maintaining one of said sheets straight and forming the back of said fish tank therewith, and bending the other sheet and forming the front and side walls of said fish tank therewith, forming an upwardly facing cavity in said base and disposing said sheets therein so that the bottom edges thereof are supported against water pressure.

6. Improvement as claimed in claim 4 providing a flat top wall for said cowl, said accoutrements including an air pump, supporting said air pump within the interior of said cowl beneath said top wall and above said fish tank.

* * * * *